Figure 1:
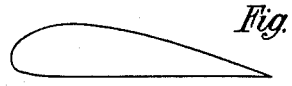

Sept. 25, 1934.    R. H. MAYO    1,974,684
MEANS FOR LAUNCHING AIRCRAFT
Filed Oct. 2, 1933    3 Sheets-Sheet 1

Robert Hobart Mayo
Inventor
By [signature] Atty.

Sept. 25, 1934.   R. H. MAYO   1,974,684
MEANS FOR LAUNCHING AIRCRAFT
Filed Oct. 2, 1933   3 Sheets-Sheet 2
Fig. 9.
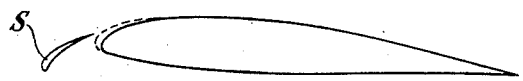
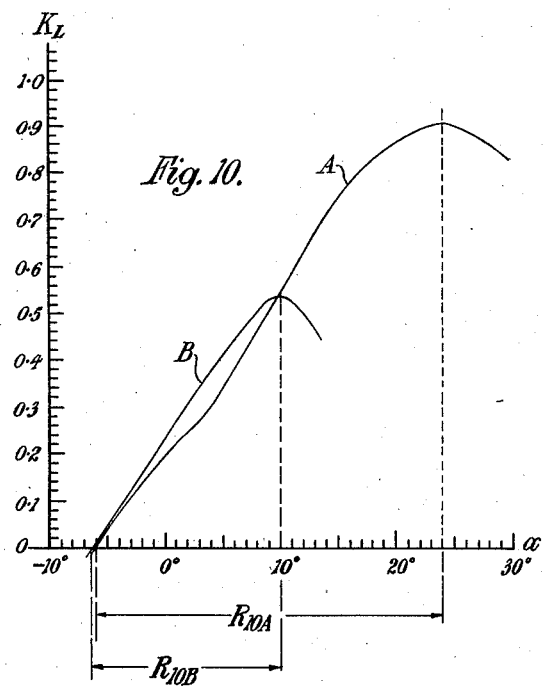
Fig. 10.
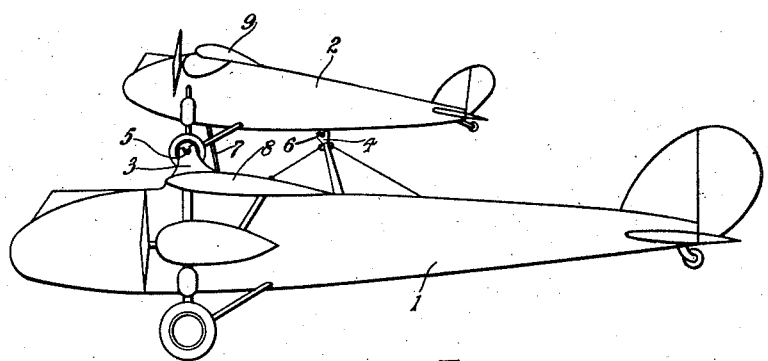
Fig. 13.

Patented Sept. 25, 1934

1,974,684

UNITED STATES PATENT OFFICE 1,974,684

MEANS FOR LAUNCHING AIRCRAFT

Robert Hobart Mayo, London, England

Application October 2, 1933, Serial No. 691,865
In Great Britain January 14, 1933

8 Claims. (Cl. 244—2)

This invention relates to means for launching an aircraft in independent flight comprising the mounting of such aircraft on top of another aircraft to form a composite aircraft which, by virtue of locking means initially securing the two components together, can be taken off, flown and if necessary landed as a single unit, said locking means being releasable during flight of the composite aircraft to permit of the separation of the two components.

In the specification accompanying my United States patent application Serial No. 661,157, filed 16th March 1933, I have described composite aircraft of this type comprising means which enable an aircraft of very high wing loading and correspondingly high minimum flying speed to be safely and effectively launched in this manner. According to this earlier specification, safe detachment of the upper component (which may be of relatively high wing loading) from the lower component is effected by increasing the angle of incidence or by otherwise increasing the lift coefficient of the wings of the upper component during flight of the composite aircraft, in order to ensure that immediately after release of the locking means the upper component will rise relatively to the lower component in controlled and sustained independent flight. In such construction and arrangement of the upper and lower components, the two components are initially set and fixed in their relation to each other so that the composite aircraft, when taking off, does so with the wings of both components contributing efficiently towards the total lift required. It was pointed out in the earlier specification that it would not be practicable to set the upper component initially in relation to the lower component so that the wings of the upper component had an appreciably larger angle of incidence than that of the wings of the lower component, because this would involve difficulties during the take-off and early flight of the composite aircraft due to the fact that the wings of the upper component would be in a stalled condition and would not only be contributing inefficiently towards the total lift required but might also cause serious interference with the control of the composite aircraft as a whole.

The present invention has for its object to provide a composite aircraft of the above-described type in which the wings of the two components may be set in such relationship as to ensure that when a certain speed has been attained the lift coefficient of the wings of the upper component will be sufficient to permit of its safe release without the necessity for increasing said lift coefficient in relation to the lift coefficient of the wings of the lower component and without involving loss of efficiency during the take-off and early flight of the composite aircraft.

According to this invention, the wings of the upper component are set in fixed relationship to the wings of the lower component, without involving the stalling of the wings of the upper component when the wings of the lower component are at their angle of maximum lift. This effect is secured by employing wings of different characteristics for the two components, the wings of the upper component being constructed with a wing section and aspect ratio resulting in a relatively wide angular range between the angle of no lift and the angle of maximum lift, while the wings of the lower component are constructed with a wing section and aspect ratio resulting in a relatively narrow angular range between the angle of no lift and the angle of maximum lift.

The type of aerofoil used in the construction of the wings of the upper component in order to secure relatively wide angular range between the angle of no lift and the angle of maximum lift will in general be a high-lift type of aerofoil of thick section, but it will be understood that not all thick or high-lift aerofoils have this characteristic. A relatively wide angular range between the angle of no lift and the angle of maximum lift may also be obtained by employing slots or other devices to increase the angular range between the angle of no lift and the angle of maximum lift. The following are examples of aerofoils suitable for the construction of the wings of the upper component, having the desired characteristic of relatively wide angular range between the angle of no lift and the angle of maximum lift:—

(i) An aerofoil such as that known as the Fokker F.VII aerofoil, which, for an aspect ratio of 6, has an angular range of approximately 26° between the angle of no lift and the angle of maximum lift. This aerofoil has a thick section with a maximum thickness of approximately 20% of the chord.

(ii) An aerofoil such as that known as the Göttingen 387 aerofoil, which, for an aspect ratio of 6, has an angular range of approximately 23° between the angle of no lift and the angle of maximum lift. This aerofoil has a fairly thick section with a maximum thickness of approximately 15% of the chord.

The type of aerofoil having a relatively narrow angular range between the angle of no lift and the angle of maximum lift, which is suitable for the construction of the wings of the lower component, will in general be an aerofoil having only a moderate maximum lift coefficient and will in general have a section of small or moderate thickness in comparison with that of the aerofoil employed for the wings of the upper component.

A relatively narrow angular range between the angle of no lift and the angle of maximum lift may also be obtained by employing flaps or other devices to reduce the angular range between the angle of no lift and the angle of maximum lift. Thus, if the aerofoil is provided with a flap which is initially at a positive or downward angle to the aerofoil but is moved upwards (either mechanically or automatically) as the air speed increases, the angular range between the angle of no lift and the angle of maximum lift will in general be reduced in comparison with the corresponding angular range of a similar aerofoil without a flap. The following are examples of aerofoils having the desired characteristic of relatively narrow angular range between the angle of no lift and the angle of maximum lift:—

(i) An aerofoil such as that known as the R. A. F. 15 aerofoil, which, for an aspect ratio of 6, has an angular range of approximately 17½° between the angle of no lift and the angle of maximum lift. This aerofoil has a thin section with a maximum thickness of approximately 6.5% of the chord.

(ii) An aerofoil such as that known as the R. A. F. 34 aerofoil, which, for an aspect ratio of 6, has an angular range of approximately 16° between the angle of no lift and the angle of maximum lift. This aerofoil has a moderately thick section with a maximum thickness of approximately 13% of the chord.

An example of the manner in which the angular range between the angle of no lift and the angle of maximum lift of an aerofoil may be reduced by means of an adjustable trailing flap is set out below. In this example, which refers to the aerofoil known as the T.64 aerofoil, the normal angular range between the angle of no lift and the angle of maximum lift is approximately 18.7°, but by means of the adjustable trailing flap this angular range can be reduced to approximately 12.1° or even less.

The following are examples of aerofoils normally having a relatively narrow angular range between the angle of no lift and the angle of maximum lift but converted by means of leading slots to have a relatively wide angular range between the angle of no lift and the angle of maximum lift:—

(i) An aerofoil such as that known as the R. A. F. 15 aerofoil with slot (the leading aerofoil being placed in the optimum position), which, for an aspect ratio of 6, has an angular range of approximately 27½° between the angle of no lift and the angle of maximum lift.

(ii) An aerofoil such as that known as the R. A. F. 31 aerofoil with slot (the leading aerofoil being placed in the optimum position), which, for an aspect ratio of 6, has an angular range of approximately 30° between the angle of no lift and the angle of maximum lift.

It will be understood that either fixed or variable slots may be employed to increase the angular range between the angle of no lift and the angle of maximum lift of an aerofoil, and that if variable slots are so employed they may be arranged to be actuated either automatically or by mechanical means.

The wings of the two components having been constructed to have different characteristics as indicated, the two components will be set in such relationship to one another that when the two components are attached together ready for flight as a composite aircraft, the wings of the two components will be at, or approximately at, their angles of maximum lift at the same time. Thus when the composite aircraft takes off at its minimum flying speed, neither component will be in a stalled condition, and thereafter as the composite aircraft accelerates the angles of incidence of the wings of both components will be reduced. By virtue of the different characteristics of the wings of the two components, the lift coefficient of the wings of the lower component will fall off more rapidly than that of the wings of the upper component, and as the speed of the composite aircraft increases the wings of the upper component will be supplying an increasing proportion of the total lift required. At a certain speed, which may be reached in normal flight or as the result of diving to the extent necessary, the wings of the upper component will supply a lifting force equal to its weight. Thereafter as the speed of the composite aircraft increases still further the lifting force on the wings of the upper component will be increased above the weight of that component while the lifting force on the wings of the lower component will be reduced below the weight of that component. At any time after the excess lift on the upper component has reached or exceeded the minimum necessary to ensure safe separation of the two components, the locking means securing the two components together may be released and the upper component will thus be launched in separate flight. Immediately after such release the upper component will rise by virtue of its excess lift while the lower component will lose height by virtue of its insufficient lift, and rapid separation of the two components will thus be obtained. A specific example illustrating the application of the invention in the case of a particular composite aircraft is set out below.

Figure 11:
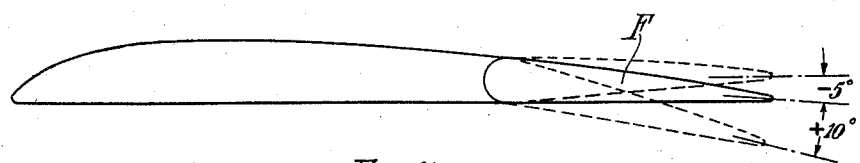
Figure 12:
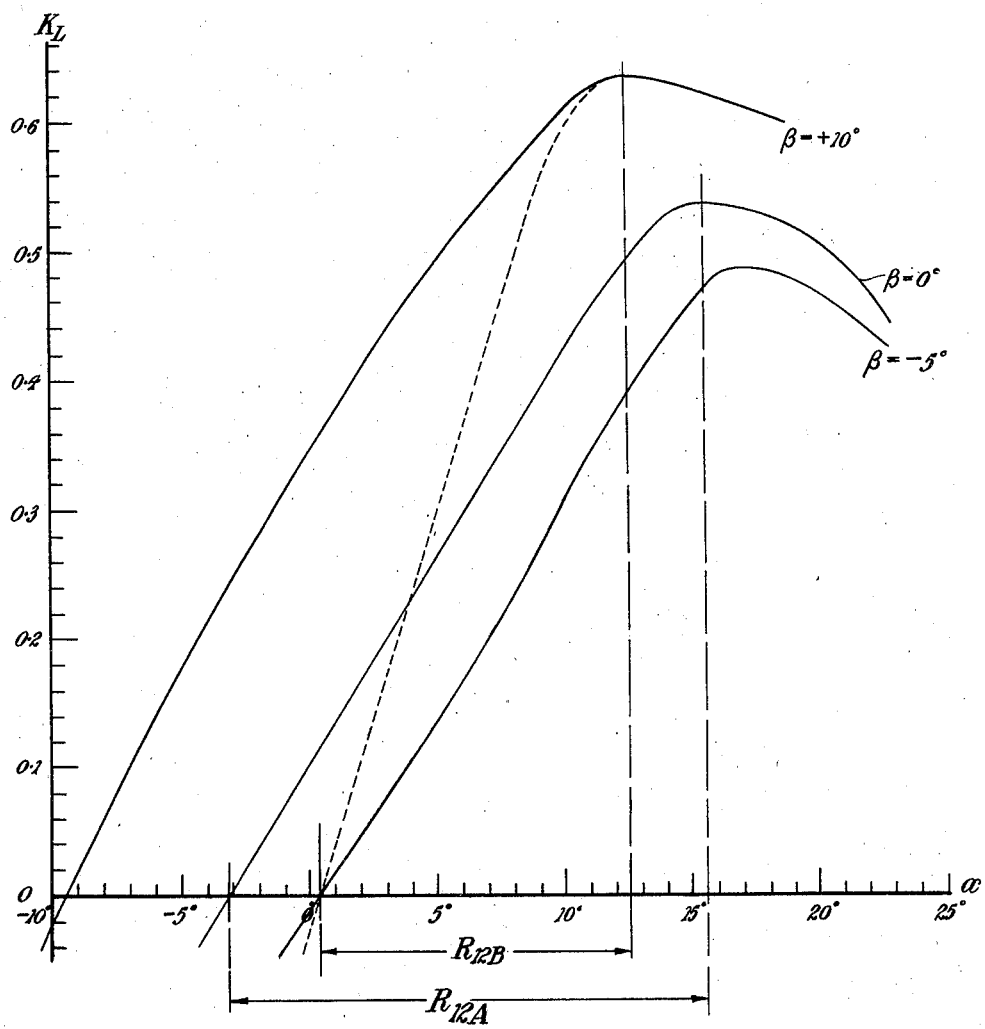

The invention will now be described in further detail with reference to the accompanying drawings, in which Figs. 1, 3, 5, 7, 9 and 11 are diagrams illustrating sections of different aerofoils and Figs. 2, 4, 6, 8, 10 and 12 are the corresponding curves showing the variation in lift coefficient of the aerofoils with changes in angle of incidence. The aerofoil section diagrams and lift coefficient curves in Figs. 1–10 are taken from the Royal Aeronautical Society's Handbook of Aeronautics. The aerofoil section diagram and lift coefficient curve in Figs. 11 and 12 are taken from the Technical Report of the Advisory Committee for Aeronautics (1921–22). Fig. 13 is a diagram showing a composite aircraft according to the invention.

Fig. 1 shows a cross-section of the aerofoil known as the Fokker F.VII aerofoil. This aerofoil is tapered from the centre towards the tips and the cross-section shown is taken at the central portion of the aerofoil. This aerofoil is of thick section and is particularly suitable for monoplane construction. The maximum thickness is approximately 20% of the chord.

Figure 2:
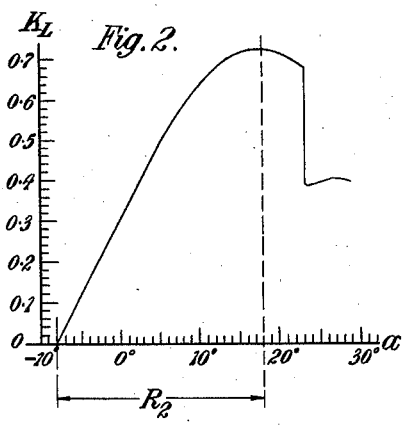

Fig. 2 is a curve showing the variation of lift coefficient of the Fokker F.VII aerofoil with angle of incidence. This curve is derived from model tests and corresponds with an aspect ratio of 6. In the case of this aerofoil the model tests show that the stalling angle is somewhat larger when the angle of incidence is being increased than when the angle of incidence is being decreased and the curve shown in Fig. 2 refers to the case where the angle of incidence is being increased The angle of incidence $\alpha$ is shown in degrees and the lift coefficient $K_L$ in British units. It will be seen that the angle of no lift is approximately $-8°$ and the angle of maximum lift approximately 18°. The angular range $R_2$ between these two angles of incidence is thus approximately 26°.

Figure 3:
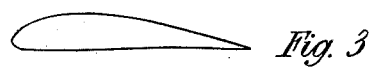

Fig. 3 shows a cross-section of the aerofoil known as the Göttingen 387. This is an aerofoil of fairly thick section and is suitable for monoplane construction. The maximum thickness is approximately 15% of the chord.

Figure 4:
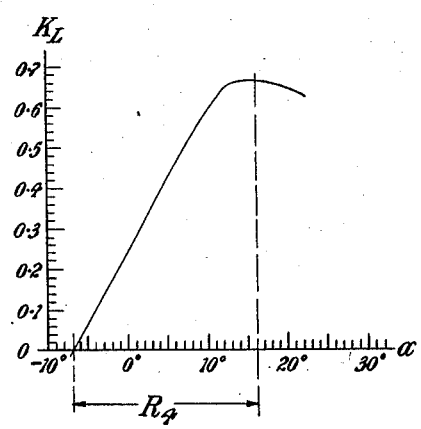

Fig. 4 is a curve showing the variation of lift coefficient of the Göttingen 387 aerofoil with angle of incidence. The curve is derived from model tests and corresponds with an aspect ratio of 6. It will be seen that the angle of no lift is approximately —7° and that the angle of maximum lift is approximately 16°. The angular range $R_4$ between these two angles of incidence is thus approximately 23°.

Figure 5:

Fig. 5 shows a cross-section of the aerofoil known as the R. A. F. 15 aerofoil. This aerofoil has a relatively thin section, the maximum thickness being only approximately 6.5% of the chord. This aerofoil is thus mainly suitable for biplane construction.

Figure 6:
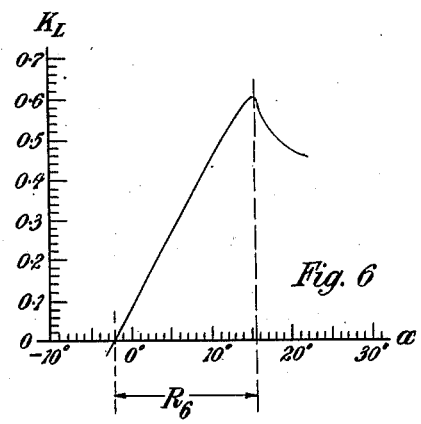

Fig. 6 is a curve showing the variation of lift coefficient of the R. A. F. 15 aerofoil with angle of incidence. The curve is derived from model tests and corresponds with an aspect ratio of 6. It will be seen that the angle of no lift is approximately —2° and the angle of maximum lift approximately 15½°. The angular range $R_6$ between these two angles of incidence is thus approximately 17½°.

Figure 7:
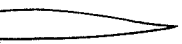

Fig. 7 shows a cross-section of the aerofoil known as the R. A. F. 34 aerofoil. This is an example of a moderately thick aerofoil which is applicable to monoplane or biplane construction. The maximum thickness is approximately 13% of the chord.

Figure 8:
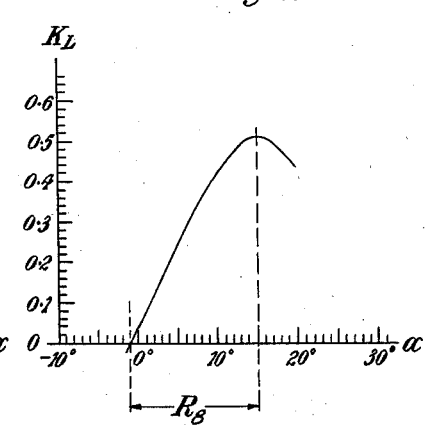

Fig. 8 is a curve showing the variation of lift coefficient of the R. A. F. 34 aerofoil with angle of incidence. The curve is derived from model tests and corresponds with an aspect ratio of 6. It will be seen that the angle of no lift is approximately —1° and the angle of maximum lift approximately —15°. The angular range $R_8$ between these two angles of incidence is thus approximately 16°.

Fig. 9 shows a cross section of the aerofoil known as the R. A. F. 31 aerofoil with slot, the leading aerofoil S and slot being placed in the optimum position for increasing the maximum lift coefficient. The leading aerofoil is shown in full lines in the open position and in dotted lines in the slot-closed position. This an an example of a moderately thick aerofoil which is applicable to monoplane or biplane construction. The maximum thickness is approximately 13% of the chord.

Fig. 10 sets out two curves A and B showing respectively the variation of lift coefficient with angle of incidence for the R. A. F. 31 aerofoil with slot (the section of which is shown in Fig. 9) and the normal R. A. F. 31 aerofoil without slot. The curves are derived from model tests and correspond with an aspect ratio of 6. It will be seen that in the case of the slotted aerofoil the angle of no lift is approximately —6° and the angle of maximum lift is approximately 24°. The angular range $R_{10A}$ between these two angles of incidence is thus approximately 30°. In the case of the aerofoil without slot the angle of no lift is approximately —6.25° and the angle of maximum lift is approximately 10°. The angular range $R_{10B}$ between these two angles of incidence is thus approximately 16.25°. It will be seen therefore that the effect of providing this aerofoil with the leading slot is to increase the angular range between the angle of no lift and the angle of maximum lift from approximately 16.25° to approximately 30°.

It will be seen also that in order to obtain this wide angular range it is only necessary to have the slot open while the angle of incidence is large (in this case above about 10°). Means (not shown in Fig. 9) may therefore be provided to enable the pilot to close the slot during flight when the angle of incidence has been reduced to the extent that it ceases to be advantageous to have the slot open. Alternatively, the slot may be of the automatic kind and be arranged to keep open automatically at large angles of incidence but to close automatically as the angle of incidence is reduced.

Fig. 11 shows a cross section of the aerofoil known as the T.64 aerofoil incorporating an adjustable trailing flap F. This is an example of a comparatively thin aerofoil which is applicable to biplane or braced monoplane construction. The maximum thickness is approximately 8% of the chord. The angular setting of the trailing flap can be adjusted during flight, either by means of a suitable control actuated by the pilot or automatically by virtue of the air forces acting upon it.

Fig. 12 sets out curves showing the variation of lift coefficient with angle of incidence for the T.64 aerofoil with trailing flap, the flap being set at various angles. The curves are derived from model tests and apply to a biplane with aspect ratio of 6, gap/chord ratio of 1, and no stagger. The lift coefficient curves include the cases where the trailing flap is set so as to form part of the normal T.64 aerofoil, and at angles (B) of +10° and —5° to that setting. The positive sign refers to the case where the flap is turned downwards, and the negative sign to the case where the flap is turned upwards from the normal position indicated in full lines in Fig. 11. The dotted curve shown in Fig. 12 represents the lift coefficient curve which can be obtained by adjusting the setting of the flap during flight of the aircraft. The aircraft is taken off with the flap set at +10°, and during flight the setting of the flap is altered to a setting of —5°. It will be seen that for the normal T.64 aerofoil the angle of no lift is approximately —3.2° and the angle of maximum lift is approximately 15.5°. The angular range $R_{12A}$ between these two angles of incidence is thus approximately 18.7°. The angle of no lift with the flap set at —5° is approximately 0.4° and the angle of maximum lift with the flap set at +10° is approximately 12.5°. The angular range $R_{12B}$ obtained by adjusting the flap during flight from an initial setting of +10° to a setting of —5° is thus approximately 12.1°. It will be seen therefore that by means of the trailing flap the angular range between the angle of no lift and the angle of maximum lift of this aerofoil can be reduced from approximately 18.7° to approximately 12.1°. An even greater reduction in this angular range could be effected by initially setting the flap at a greater angle than +10° and/or altering this angular setting during flight to a greater negative angle than —5°.

It will be appreciated that the aerofoils to which Figs. 1–12 refer are merely selected as examples of aerofoils having the characteristics to which reference has been made above. The selection of the actual aerofoils to be employed for the upper and lower components of the composite aircraft respectively will in practice be determined in relation to the general design and desired characteristics of the two component aircraft. In each case, however, the aerofoils of the two components will be selected in accordance with the invention so that the angular range between the angle of no lift and the angle of maximum lift is appreciably wider in the case of the upper component than in the case of the lower component. It will be appreciated also that the wing sections will be selected having regard to the aspect ratio employed for the wings of the upper and lower components. The effect of increasing the aspect ratio of an aerofoil will in general be to increase the maximum lift coefficient but at the same time to reduce the angular range between the angle of no lift and the angle of maximum lift. Thus in practice the wing sections for the two component aircraft will be so selected in relation to the aspect ratio employed that the desired difference in angular range between the angles of no lift and the angles of maximum lift will be obtained.

Fig. 13 shows a side elevation of an example of a composite aircraft according to the invention in which the lower component 1 has mounted on the upper surface of its wings sockets 3 in which the axles 5 of the undercarriage of the upper component 2 rest. Further aft the lower component 1 has mounted on it another socket 4 in which the pin 6 which is attached to the upper component 2 rests. The upper component 2 is held securely to the sockets 3 and the socket 4 by means of a rod or cable 7 which is initially in tension and which is releasable during flight of the composite aircraft. In this example the aerofoil 8 employed for the wings of the lower component 1 is the aerofoil known as the R. A. F. 34 aerofoil which, as explained above, is a moderately thick aerofoil having the characteristic of a relatively small angular range between the angle of no lift and the angle of maximum lift. The angular range between these two angles of incidence is approximately 16° and the angle of maximum lift is approximately 15°. The aerofoil 9 employed for the wings of the upper component is the aerofoil known as the Fokker F. VII aerofoil which, as explained above, is a thick high lift aerofoil having the characteristic of relatively wide angular range between the angle of no lift and the angle of maximum lift. The angular range between these two angles of incidence in this case is approximately 26° and the angle of maximum lift is approximately 18°. It will be seen that the upper component is so set in relation to the lower component that the angle of incidence of the wings of the upper component is 3° greater than that of the angle of incidence of the wings of the lower component. Thus both components will be at their angle of maximum lift at the same time and the wings of neither component will be in a stalled condition when the composite aircraft takes off. For the reasons explained above, the selection of the respective aerofoils for the wings of the two components in accordance with the invention will have the result that, as the composite aircraft accelerates, the lift coefficient of the wings of the lower component will fall off more rapidly than that of the wings of the upper component until, when a certain speed is reached, the upper component will have sufficient excess lift to ensure safe separation of the two components when the rod or cable 7 attaching them together is released.

The following example illustrates the application of the invention in the case of a particular composite aircraft, in which the Fokker F.VII aerofoil and the R. A. F. 34 aerofoil are employed for the wings of the upper and lower components respectively. It will be appreciated that the figures given below are approximate only, and are merely intended to illustrate the principle explained. No account is taken of the lift of tail planes, etc. It is assumed that the wings have the lift coefficient curves shown in Figs. 2 and 8 respectively, and that the heavily loaded upper component, which it is desired to launch, has a minimum flying speed which is 50% higher than that of the composite aircraft. It is also assumed, for the sake of simplicity only, that the two components are of equal total weight.

Let  $W$ = total weight of each component.
 $A_1$ = wing area of upper component.
 $A_2$ = wing area of lower component.
 $V_m$ = minimum flying speed of composite aircraft.
 $1.5\ V_m$ = minimum flying speed of upper component.
 $\rho$ = air density.

In accordance with the principles explained above the two components will be so set in relation to each other that during the take-off of the composite aircraft the wings of both components will be operating at their maximum lift coefficients. These occur at angles of incidence of approximately 18° in the case of the upper component and 15° in the case of the lower component, so that the wings of the upper component will be set at an angle of incidence greater by 3° than that of the wings of the lower component. The maximum lift coefficients of the two aerofoils are 0.73 and 0.51 respectively (see Figs. 2 and 8).

The relationship between the wing areas is determined by the following two equations, which represent the conditions for horizontal flight at minimum flying speed of the upper component alone and of the composite aircraft respectively:—

$$W = \rho . A_1 . 0.73 . (1.5 V_m)^2$$
$$2W = \rho . A_1 . 0.73 . V_m^2 + \rho . A_2 . 0.51 . V_m^2$$
$$\therefore A_2 = \frac{2 \times 0.73 \times 1.5^2 - 0.73}{0.51} A_1 = 5 A_1$$

i. e. the lower component will have five times the wing area of the upper component.

When the composite aircraft takes off at its minimum flying speed the proportions in which the two components contribute towards the total lift required will be as follows, taking $L_1$ as the lift of the wings of the upper component and $L_2$ as the lift of the wings of the lower component:—

$$\frac{L_1}{L_2} = \frac{\rho . A_1 . 0.73 . V_m^2}{\rho . 5 A_1 . 0.51 . V_m^2} = 0.286$$
$$L_1 + L_2 = 2W$$
$$\therefore L_1 = 0.445 W$$
$$L_2 = 1.555 W$$

If $R$ is the reaction between the two components, $$R = W - L_1 = L_2 - W = 0.555 W$$

and there will thus be a force of $0.555W$ tending to prevent separation of the two components.

As the composite aircraft accelerates, however, the choice of aerofoils in accordance with the invention will result in the lift on the upper component increasing and the lift on the lower component decreasing until at a certain air speed (which will be in excess of the minimum flying speed of the upper component) each component will be just lifting its own weight. As the composite aircraft accelerates further the lift on the upper component will become greater than that on the lower component, and there will be a resulting force tending to separate the two components.

Thus, for example, when the composite aircraft has accelerated to the speed ($V_1$) at which the angles of incidence of the wings of the two components are 1° (lower) and 4° (upper) the proportions in which the two components contribute to the total lift required are determined as follows:—

Lift coefficient of wings of
upper component (see Fig. 2) = 0.455

Lift coefficient of wings of
lower component (see Fig. 8) = 0.075

$$\text{Total lift} = \rho.A_1.0.455.V_1^2 + \rho.5\,A_1.0.075V_1^2 = 2W = 2\rho.A_1.0.73.(1.5V_m)^2$$

$$\therefore V_1^2 = \frac{2 \times 0.73 \times 1.5^2}{0.455 + 5 \times 0.075}V_m^2 = 3.96V_m^2$$

$$\therefore V_1 = 1.99V_m$$

Then, if $L_1$ = lift of wings of upper component $L_2$ = lift of wings of lower component $$\frac{L_1}{L_2} = \frac{0.455}{5 \times 0.075}$$

$$L_1 + L_2 = 2W$$

$$\therefore L_1 = 1.1W$$

$$L_2 = 0.9W$$

If T is the tension force between the two components, $$T = L_1 - W = W - L_2 = 0.1W$$

thus at an air speed of approximately twice the minimum flying speed of the composite aircraft the upper component will be more than lifting its own weight and there will be a force of approximately $0.1W$ tending to separate the two components.

When the composite aircraft has still further accelerated to the speed ($V_2$) at which the angles of incidence of the wings of the two components are 0.5° (lower) and 3.5° (upper) the distribution of lift between the two components is determined as follows:—

Lift coefficient of wings of
upper component (see Fig. 2) = 0.435
Lift coefficient of wings of
lower component (see Fig. 8) = 0.055

$$\text{Total lift} = \rho.A_1.0.435.V_2^2 + \rho.5.A_1.0.055.V_2^2 = 2W = 2.\rho.A_1.0.73.(1.5V_m)^2$$

$$\therefore V_2^2 = \frac{2 \times 0.73 \times 1.5^2}{0.435 + 5 \times 0.055}.V_m^2 = 4.62V_m^2$$

$$\therefore V_1 = 2.15V_m$$

Then, if $L_1$ = lift of wings of upper component $L_2$ = lift of wings of lower component $$\frac{L_1}{L^2} = \frac{0.435}{5 \times 0.055}$$

$$L_1 + L_2 = 2W$$

$$L_1 = 1.225W$$

$$L_2 = 0.775W$$

Thus at an air speed of approximately 2.15 times the minimum flying speed of the composite aircraft the upper component will have an excess lift of 0.225 times its own weight, while the lower component will have a deficiency of lift of the same amount; there will thus be a force of approximately 0.225 W tending to separate the two components.

It will be seen that as the speed of the composite aircraft is increased the lift of the wings of the upper component will continually increase while the lift of the wings of the lower component will continually decrease due to the difference in the characteristics of the aerofoils selected in accordance with the invention. The performance of the composite aircraft will normally be such that it can attain in level flight a speed in excess of the minimum speed at which the two components will tend to separate, but in any case the speed of the composite aircraft may be augmented by diving until any desired speed is attained.

As explained above, the locking means securing the two components together may be arranged to be released at any desired time after the composite aircraft has reached a speed at which the upper component has an excess lift and there is a force acting between the two components tending to separate them. It will be seen that when the locking means are so released the upper component will immediately rise clear of the lower component in a safely air-borne and unstalled condition. At the time of its release from the lower component the upper component will in general be flying at an angle of incidence in the region of that corresponding with the maximum lift/drag ratio, and the upper component will thus be launched under particularly favourable conditions. At the time of separation of the two components the lower component will be deficient in lift and will thus tend to drop away from the upper component. As soon as the two components have safely separated, however, the pilot of the lower component will be able, by manipulation of his controls, to increase the lift on the lower component to the extent necessary for the separate flight of that component.

The upper component may be mounted on the lower component with three or more points of attachment and locking means securing the attachments until it is desired to effect detachment of the upper component from the lower component. Alternatively, instead of there being several points of attachment with locking means, the upper component may rest in sockets or seatings on the lower component, and be held in position by separate securing means. Preferably the upper component will be finally held to the lower component at a single point of attachment, so that any risk of the free detachment of the upper component being impeded by the failure of one or more locking means to release at the proper time will be eliminated.

The mountings and locking means employed for connecting the two components of the composite aircraft together may conveniently be similar to those described in the specification accompanying my co-pending United States patent application Serial No. 661,157, filed 16th March 1933, and may be accompanied by any of the various safety devices, described in that specification which can appropriately be used in conjunction with the present invention. For example, means may be provided for preventing complete release of the locking means until the wings of the upper component have sufficient lift to ensure safe separation of the components and independent controlled flight of the upper component immediately after such separation. Again, the locking means may be arranged to be released only by the combined or consecutive operation of controls located in both components.

It will furthermore be appreciated that the method of securing safe separation of the components described in my United States patent application Serial No. 661,157 may be employed in conjunction with the method according to the present invention. By combining these methods safe separation can, if desired, be secured by increasing the lift coefficient of the wings of the upper component to a lesser extent, and/or by constructing the wings of the upper component to have characteristics which differ from those of the wings of the lower component to a lesser extent than would be required if the method according to one or other of the inventions were employed alone.

It will be understood that either component of a composite aircraft according to the invention may be of land, marine or amphibian type.

What I claim as my invention and desire to secure by Letters Patent is:—

1. A composite aircraft comprising in combination an upper component aircraft mounted upon a lower component aircraft, the upper component having wings which have an appreciably wider angular range between their angle of no lift and their angle of maximum lift than the corresponding angular range of the wings of the lower component, and releasable locking means securing the two components together.

2. A composite aircraft comprising in combination an upper component aircraft mounted on a lower component aircraft, wings associated with the upper component which have a thick high-lift section and a relatively wide angular range between the angle of no lift and the angle of maximum lift, wings associated with the lower component which are of relatively narrow angular range between the angle of no lift and the angle of maximum lift, and releasable locking means securing the two components together.

3. A composite aircraft comprising in combination an upper component aircraft mounted upon a lower component aircraft, a device associated with either component, which acts automatically during flight of the composite aircraft to increase the angular range between the angle of no lift and the angle of maximum lift of the wings of the upper component relatively to the corresponding angular range of the wings of the lower component, and releasable locking means securing the two components together.

4. A composite aircraft comprising in combination an upper component aircraft mounted upon a lower component aircraft, a device associated with either component which is operable to increase the angular range between the angle of no lift and the angle of maximum lift of the wings of the upper component relatively to the corresponding angular range of the wings of the lower component, means for actuating the device aforesaid, and releasable locking means for securing the two components together.

5. A composite aircraft comprising in combination an upper component aircraft mounted upon a lower component aircraft, the upper component having wings which are provided with slots arranged to keep open automatically at large angles of incidence so as to increase the angular range between the angle of no lift and the angle of maximum lift of said wings relatively to the corresponding angular range of the wings of the lower component, and releasable locking means securing the two components together.

6. A composite aircraft comprising in combination an upper component aircraft mounted upon a lower component aircraft, the lower component having wings which are provided with flaps which are adjustable to decrease the angular range between the angle of no lift and the angle of maximum lift of said wings relatively to the corresponding angular range of the wings of the upper component, and releasable locking means securing the two components together.

7. A composite aircraft comprising in combination an upper component aircraft of relatively high wing loading mounted upon a lower component aircraft of relatively low wing loading, the upper component having wings which have an appreciably wider angular range between their angle of no lift and their angle of maximum lift than the corresponding angular range of the wings of the lower component, and releasable locking means securing the two components together.

8. A composite aircraft, comprising an upper component aircraft mounted on a lower component aircraft, releasable locking means securing the two components together, and wings associated respectively with the upper and lower components which are so set that they will be at their angles of maximum lift at substantially the same time, the wings of the upper component having an appreciably wider angular range between their angle of no lift and their angle of maximum lift than the corresponding angular range of the wings of the lower component, whereby, as the composite aircraft accelerates, the lift on the wings of the upper component will automatically increase relatively to that on the wings of the lower component.

ROBERT HOBART MAYO.